United States Patent Office 2,911,403
Patented Nov. 3, 1959

2,911,403
PROCESS FOR THE OXIDATION OF $\Delta^4$-3-HYDROXY-STEROIDS TO $\Delta^4$-3-KETO-STEROIDS Franz Sondheimer, Jesus Romo, and George Rosenkranz, Mexico City, Mexico, and Carl Djerassi, Birmingham, Mich., assignors, by mesne assignments, to Syntex S.A., Mexico City, Mexico, a corporation of Mexico No Drawing. Application March 23, 1953
Serial No. 344,246
Claims priority, application Mexico March 25, 1952
7 Claims. (Cl. 260—239.55)

The present invention relates to a novel process for the production of cyclopentanophenanthrene compounds. More particularly the present invention relates to the oxidation of steroid hydroxy groups having a double bond in $\alpha,\beta$ relation thereto.

In accordance with the present invention it has been discovered that when steroids containing a double bond in $\alpha,\beta$ relation to a hydroxy group are treated with manganese dioxide the hydroxy group is oxidized to a keto group even though other hydroxy groups not so positioned in the molecule remain intact. It has further been discovered in accordance with the present invention that a similar reaction may be carried out with Raney nickel catalyst in the presence of a hydrogen acceptor.

The process of the present invention is especially applicable to the oxidation of steroidal $\Delta^4$-3-alcohols to the corresponding steroidal $\Delta^4$-3-keto compounds and the following equations illustrate by way of example this oxidation:

Although the above equations illustrate the conversion of steroidal $\Delta^4$-3-alcohols to $\Delta^4$-3-ketones, the same reactions are applicable to other $\alpha,\beta$-unsaturated steroid alcohols such as $\Delta^{16}$-20-alcohols. Preferably in practicing the present invention the steroid alcohol is dissolved in a suitable organic solvent such as chloroform, hexane or benzene and then shaken at room temperature with manganese dioxide for a substantial period of time, as for example for 5 to 24 hours. Although room temperature or slightly above as indicated is preferred, higher temperatures may be utilized to accelerate the reaction.

After the oxidation is complete the solution is filtered and the filtrate evaporated to dryness. The residue is then recrystallized from a suitable solvent.

Where Raney nickel is utilized for the oxidation indicated above, the steroid alcohol is preferably dissolved in the hydrogen acceptor which is preferably a ketone such as acetone. The solution is then refluxed with the Raney nickel for approximately six hours and the catalyst filtered. After the filtrate was evaporated to dryness the ketone fraction was separated by use of the known Girard T reagent and purified as by recrystallization from a suitable solvent.

The type of Raney nickel used in the reaction is not critical. However, especially good results have been obtained by the use of Raney nickel prepared according to the method of Mozingo (Organic Synthesis, 21, 15, 1941) or of Pavlic and Adkins (J.A.C.S., 68, 1471).

It is to be noted further that the present process is generally applicable to the oxidation of steroidal hydroxy

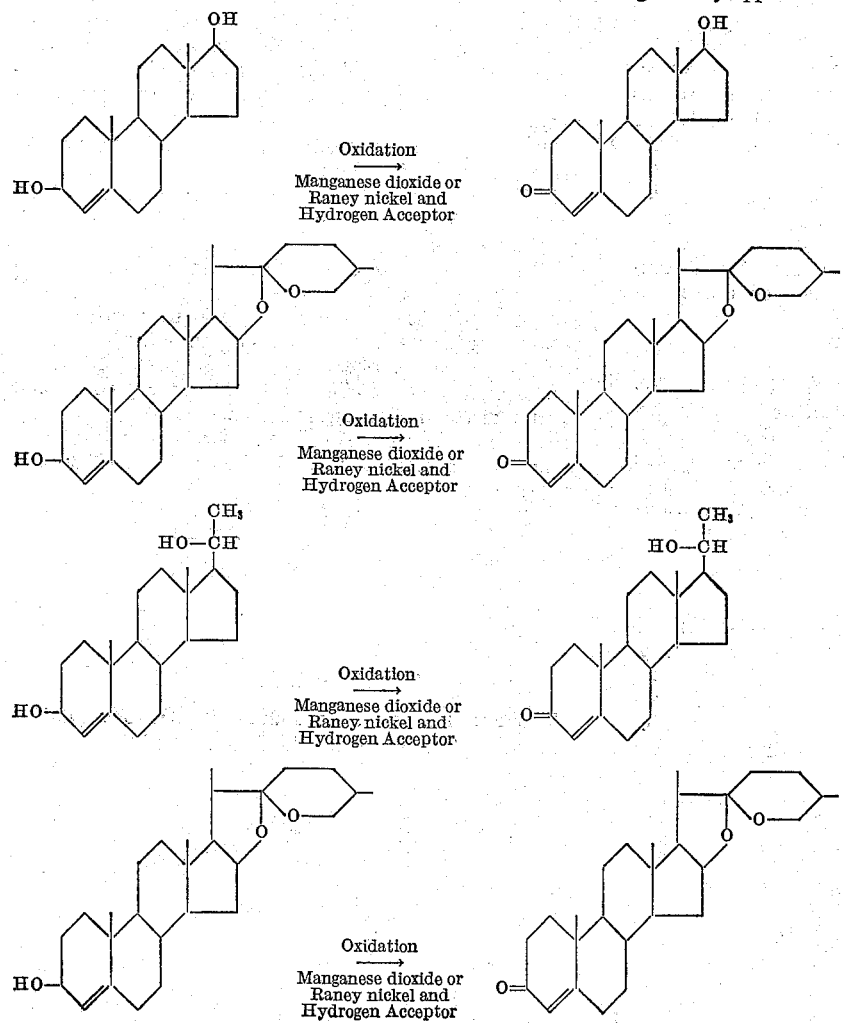

groups having a double bond in α,β position relative thereto irrespective of the configuration (α or β) of these hydroxy groups. Further, that the compounds illustrated in the preceding equations and subsequent examples are intended only to illustrate typical examples of the sapogenin series, androstene series, pregnene series and cholestene series:

*Example I*

A mixture of 1 g. of $\Delta^4$-androsten-3,17β-diol in 80 cc. of anhydrous chloroform and 10 g. of manganese dioxide previously dried over phosphorous pentoxide was shaken during 24 hours at room temperature and then the solution was filtered and evaporated to dryness. Recrystallization of the residue from acetone-hexane yielded 620 mg. of testosterone having a melting point of 151°–153° C. $[\alpha]_D + 112°$ (chloroform). The compound showed an ultraviolet absorption maximum at 242 mμ, log E 4.33. The identity of the product thus obtained was confirmed by comparison with an authentic sample of testosterone; the mixed melting point showed no depression and the infrared spectra were identical.

*Example II*

A mixture of 500 mg. of $\Delta^4$-22-isospirosten-3-ol in 40 cc. of benzene and 5 g. of manganese dioxide previously dried over phosphorous pentoxide was shaken for five hours at room temperature and then the solution was filtered and evaporated to dryness. Recrystallization from pentane yielded 390 mg. of crystals having a melting point of 179°–183° C. $[\alpha]_D \pm 0°$ (chloroform). The product thus obtained was shown to be $\Delta^4$-22-isospirosten-3-one by comparison with an authentic sample; the mixed melting point showed no depression and the infrared spectra were identical.

*Example III*

500 mg. of $\Delta^4$-pregnen-3, 20β-diol dissolved in 50 cc. of chloroform were mixed with 5 g. of manganese dioxide previously dried over phosphorous pentoxide and the mixture was shaken for 24 hours at room temperature. After filtering and evaporating to dryness, the residue was crystallized from pentane to give 300 mg. of crystals with a melting point of 170°–173° C., $[\alpha]_D + 89°$ (chloroform) which was identical to $\Delta^4$-pregnen-20β-ol-3-one when compared with an authentic sample of this compound; the mixed melting point showed no depression and the infrared spectra were identical.

*Example IV*

A solution of 2 g. of $\Delta^4$-androsten-3, 17β-diol in 700 cc. of acetone was refluxed with 20 g. of Raney nickel for 6 hours. The catalyst was filtered and the solution was evaporated to dryness. The residue was subjected to a separation with Girard T reagent by the known method, and the ketonic fraction yielded 1 g. of testosterone which after recrystallization from ether-hexane had a melting point of 151°–152°.

*Example V*

A solution of 1.5 g. of $\Delta^4$-22-isopirosten-3-ol in 700 cc. of acetone was refluxed during 6 hours with 25 g. of Raney nickel prepared by the method of Pavlic and Adkins, previously referred to. The catalyst was filtered and the filtrate was evaporated to dryness. After reaction with Girard T reagent, 700 mg. of a ketonic fraction were obtained. Recrystallization from acetone-hexane afforded $\Delta^4$-22-isospirsten-3-one with a melting point of 174°–177° C.

*Example VI*

A solution of 3 g. of $\Delta^4$-pregnen-3, 20β-diol in 400 cc. of acetone was refluxed during 6 hours with 40 g. of Raney nickel. The catalyst was filtered and the solution was evaporated to dryness. By reaction with Girard T reagent 1.5 g. of a ketonic fraction was obtained. Recrystallization from methanol-water yielded $\Delta^4$-pregnen-20β-ol-3-one (20-dihydroprogesterone) having a melting point of 166°–169° C.

*Example VII*

A solution of 2 g. of $\Delta^4$-cholesten-3-ol in 500 cc. of acetone was refluxed during 6 hours with 20 g. of Raney nickel prepared according to the method of Mozingo, previously referred to. After filtering the catalyst the solution was evaporated to dryness. Recrystallization from acetone-methanol gave 1.3 g. of $\Delta^4$-cholesten-3-one with a melting point of 78°–80° C.

*Example VIII*

A solution of 500 mg. of $\Delta^{16}$-allopregnen-3β, 20β-diol in 50 cc. of benzene was mixed with 5 g. of manganese dioxide and then shaken at room temperature for 24 hours. The solution was filtered and evaporated to dryness. The crude product exhibited an ultraviolet absorption maximum at 236 mμ (log E 3.7) thus indicating a 50% conversion to the $\Delta^{16}$-20-ketone, i.e., $\Delta^{16}$-allopregnen-3β-ol-20-one.

We claim:

1. A process for the production of a $\Delta^4$-3-keto compound, said compound being otherwise unsubstituted α to the $\Delta^4$ double bond and selected from the group consisting of a $\Delta^4$-3-keto androstene, a $\Delta^4$-3-keto sapogenin and a $\Delta^4$-3-keto pregnene which comprises oxidizing the corresponding $\Delta^4$-3-hydroxy compound with manganese dioxide at room temperature.

2. The process of claim 1 wherein the product and starting material is a sapogenin.

3. The process of claim 1 wherein the product is $\Delta^4$-22-isospirosten-3-one and the starting material is a $\Delta^4$-22-isospirosten-3-ol.

4. The process of claim 1 wherein the product and starting material is a pregnene.

5. The process of claim 1 wherein the starting compound is a $\Delta^4$-pregnen-3, 20β-diol and the product is $\Delta^4$-pregnen-20β-ol-3-one.

6. The process of claim 1 wherein the product and starting material is an androstene.

7. The process of claim 1 wherein the starting compound is a $\Delta^4$-androsten-3, 17β-diol and the product is testosterone.

References Cited in the file of this patent

UNITED STATES PATENTS 2,530,817    Ehrenstein _____ Nov. 21, 1950
2,786,855    Sondheimer et al. _____ Mar. 26, 1957

OTHER REFERENCES

Thonon: Bul. soc. chim. Belges, 58, 331–349 (1949).
Sabatier: Compt. rend., 185, 241–244 (1927).